(12) United States Patent
Canepa et al.

(10) Patent No.: US 10,664,168 B2
(45) Date of Patent: May 26, 2020

(54) DATA TRANSFERS WITH ADAPTIVELY ADJUSTED POLLING TIMES

(71) Applicant: Seagate Technology LLC, Cupertino, CA (US)

(72) Inventors: Timothy Canepa, Los Gatos, CA (US); Stephen Hanna, Fort Collins, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/201,767

(22) Filed: Nov. 27, 2018

(65) Prior Publication Data

US 2019/0095099 A1   Mar. 28, 2019

Related U.S. Application Data

(63) Continuation of application No. 15/606,549, filed on May 26, 2017, now Pat. No. 10,140,027.

(51) Int. Cl.
| | | |
|---|---|---|
| G06F 12/02 | (2006.01) | |
| G06F 3/06 | (2006.01) | |
| G06F 13/16 | (2006.01) | |

(52) U.S. Cl.
CPC ............ G06F 3/061 (2013.01); G06F 3/0659 (2013.01); G06F 3/0679 (2013.01); G06F 13/16 (2013.01); *G06F 12/0246* (2013.01)

(58) Field of Classification Search
None
See application file for complete search history.

(56) References Cited

U.S. PATENT DOCUMENTS

| | | | |
|---|---|---|---|
| 5,159,672 A | * | 10/1992 | Salmon .................. G06F 13/28 711/103 |
| 6,804,741 B2 | | 10/2004 | Cowan |
| 7,844,778 B2 | | 11/2010 | Shen et al. |
| 8,495,299 B2 | | 7/2013 | Fuller et al. |
| 8,533,401 B2 | | 9/2013 | Edirisooriya et al. |
| 8,825,940 B1 | | 9/2014 | Diggs |
| 9,176,859 B2 | | 11/2015 | Walston et al. |
| 9,250,901 B2 | | 2/2016 | Sodhi et al. |
| 9,405,672 B2 | | 8/2016 | Canepa et al. |
| 9,824,004 B2 | | 11/2017 | Mirichigni |
| 2008/0209112 A1 | | 8/2008 | Yu et al. |
| 2009/0172213 A1 | | 7/2009 | Jayachandran et al. |
| 2010/0250793 A1 | | 9/2010 | Syu |

(Continued)

FOREIGN PATENT DOCUMENTS

JP        2014110058 A     6/2014

*Primary Examiner* — Brian R Peugh
(74) *Attorney, Agent, or Firm* — Hall Estill Attorneys At Law

(57) ABSTRACT

Method and apparatus for managing data in a memory, such as a flash memory. In accordance with some embodiments, a memory module has a non-volatile memory (NVM) and a memory module electronics (MME) circuit. A controller circuit communicates a first command to the MME circuit to perform a selected action upon a selected address of the NVM. After a variable delay time interval, a second command is communicated by the controller circuit to the MME circuit as a status request regarding the first command. The variable delay time interval is determined based on an accumulated count of status requests that were issued, prior to the first command, for the selected address.

20 Claims, 5 Drawing Sheets

(56) References Cited

U.S. PATENT DOCUMENTS

| | | |
|---|---|---|
| 2014/0047170 A1 | 2/2014 | Cohen et al. |
| 2014/0082398 A1* | 3/2014 | Lee .......................... G06F 1/10 |
| | | 713/401 |
| 2015/0154118 A1 | 6/2015 | Maren et al. |
| 2016/0019160 A1 | 1/2016 | Mohan et al. |
| 2016/0379689 A1 | 12/2016 | Roh et al. |
| 2018/0039572 A1 | 2/2018 | Mirichigni |

* cited by examiner

DATA TRANSFERS WITH ADAPTIVELY ADJUSTED POLLING TIMES

RELATED APPLICATION

The present application is a continuation of co-pending U.S. patent application Ser. No. 15/606,549 filed May 26, 2017, which issued as U.S. Pat. No. 10,140,027 on Nov. 27, 2018.

SUMMARY

Various embodiments of the present disclosure are generally directed to the management of data in a memory, such as but not limited to a flash memory.

In accordance with some embodiments, an apparatus includes a memory module and a controller circuit. The memory module comprises a non-volatile memory (NVM) and a memory module electronics (MME) circuit configured to program data to and read data from solid-state non-volatile memory cells of the NVM. The controller circuit is configured to communicate, to the memory module, a first command comprising a selected address within the NVM and a selected action to be taken by the MME circuit in relation to the selected address. The controller circuit is further configured to subsequently communicate, to the memory module, a second command comprising a status request associated with completion of the first command at a conclusion of a variable delay time interval. The variable delay time interval is selected responsive to an accumulated count of status requests previously communicated, by the controller circuit to the memory module, for previous commands associated with the selected address issued prior to the communication of the first command.

In further embodiments, a method includes steps of communicating, from a controller circuit to a memory module electronics (MME) circuit of a memory module, a first command comprising a selected address in a non-volatile memory (NVM) of the memory module and a selected action to be taken by the MME circuit in relation to the address. A variable delay time interval is initiated in response to the communication of the first command. At the conclusion of the variable delay time interval, a second command is communicated from the controller circuit to the MME circuit as a status request associated with completion of the first command. The variable delay time interval is selected responsive to an accumulated count of status requests previously communicated, by the controller circuit to the memory module, for the selected address prior to the communication of the first command.

These and other features which may characterize various embodiments can be understood in view of the following detailed discussion and the accompanying drawings.

DETAILED DESCRIPTION

Figure 1:
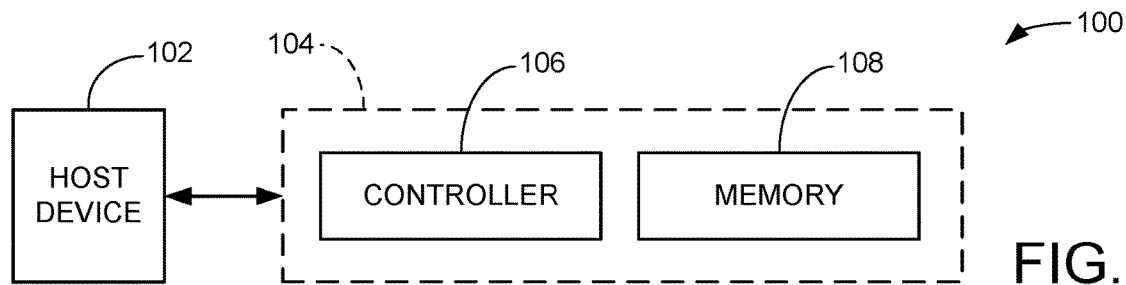
FIG. 1 provides a functional block representation of a data storage device in accordance with various embodiments.

The present disclosure generally relates to managing data stored in a memory, such as but not limited to a flash memory of a solid state drive (SSD).

A wide variety of data storage memories are known in the art. Some memories are formed from solid-state memory cells which store data in relation to an amount of accumulated charge on a floating gate structure, such as with flash memory. An erasure operation is generally required before new data can be written to a given flash memory location.

Some flash memory devices include a flash memory module and a controller. A pull system is used whereby the controller issues commands to the memory module and subsequently checks to determine if the requested command has been completed. This tends to increase the number of times that commands need to be issued to the memory module, such as in the case where a status is repetitively checked after the issuance of a command.

It is common for a manufacturer of a memory module to specify particular command completion times for various commands such as reading, writing (programming) and erase operations. It has been found that such specifications may be best-case values and may not represent actual system operation at different locations and under different environmental conditions and states.

Variations in command completion time can adversely affect data transfer performance between the controller and the memory module in multiple ways. If the command completion time takes significantly longer than expected, multiple status requests may be issued by the controller, each of which will be responded to with a "not ready" type returned status. The servicing of such premature status requests can consume significant processing resources of both the controller and the memory module. On the other hand, if commands are completed at a rate that is significantly faster than expected, the controller may unnecessarily wait for the completion of the command before issuing a status request and proceeding to subsequent steps, such as issuing commands or transferring data to other processes.

Accordingly, various embodiments of the present disclosure are generally directed to an apparatus and method for managing data in a memory, such as but not limited to a flash memory in a solid state drive (SSD). As explained below, some embodiments provide a controller circuit configured to communicate with a memory module. The memory module comprises a memory module electronics (MME) circuit and a non-volatile memory (NVM). The NVM is formed from a plurality of solid-state non-volatile memory cells, such as a flash memory array. The controller circuit is configured to communicate, to the memory module, a first command comprising address information and a first operation code identifying a first action to be taken by the memory module in relation to the address information.

The controller circuit is further configured to subsequently communicate, to the memory module, a second command comprising a status request associated with the first command. The second command is issued responsive to an adaptive, or variable delay time interval determined by the control circuit based on history statistics associated with the address information of the first command. In this way, the controller circuit adaptively adjusts the delay time based on observed behavior of the memory module to more closely match the actual command completion time performance of the module.

These and other features and advantages of various embodiments can be understood beginning with a review of FIG. 1 which provides data handling system 100. The system 100 includes a host device 102 and a data storage device 104. The data storage device 104 includes a controller 106 and a memory module 108. The controller is a programmable processor and/or hardware based circuit that provides top level communication and control functions for data transfers to and from non-volatile memory (NVM) storage in the memory module 108. The data transfers between the host device and the data storage device may be provided via a selected protocol.

Figure 2:
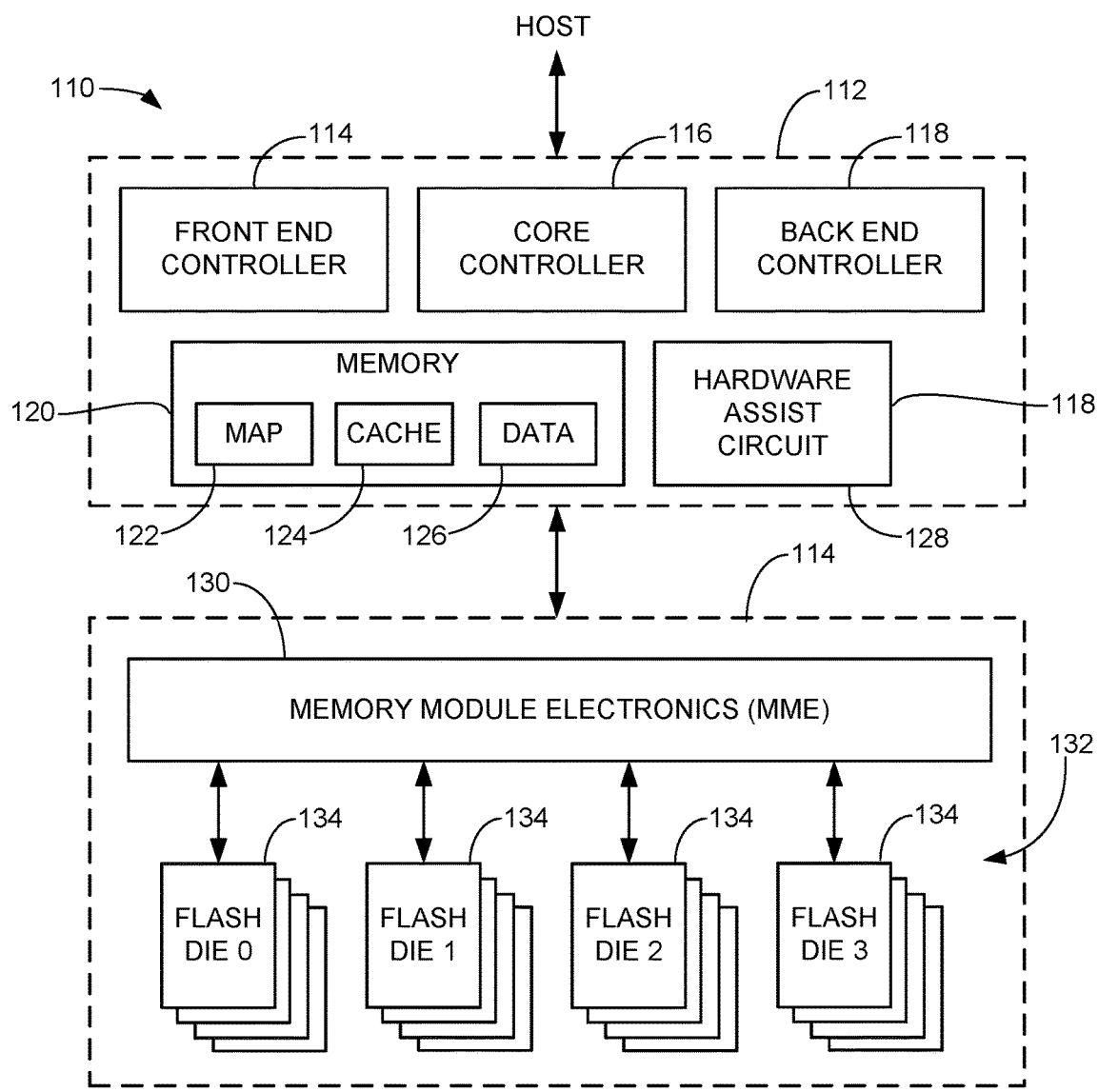
FIG. 2 shows aspects of the device of FIG. 1 characterized as a solid state drive (SSD) in accordance with some embodiments.

FIG. 2 shows a data storage device 110 generally corresponding to the device 104 in FIG. 1. The device 110 is configured as a solid state drive (SSD) that communicates with a host device such as 102 in FIG. 1 via one or more Peripheral Component Interface Express (PCIe) ports, although other configurations can be used.

The SSD 110 includes a controller circuit 112 and a memory module 114. The controller circuit 112 (hereinafter "controller") includes a front end controller 114, a core controller 116 and a back end controller 118. The front end controller 114 performs host I/F functions, the back end controller 118 directs data transfers with the memory module 114 and the core controller 116 provides top level control for the device.

Each controller 114, 116 and 118 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less than three programmable processors) can be configured to carry out each of the front end, core and back end processes using associated FW in a suitable memory location. A pure hardware based controller configuration can also be used. The various controllers may be integrated into a single system on chip (SOC) integrated circuit device, or may be distributed among various discrete devices as required.

A controller memory 120 represents various forms of volatile and non-volatile memory (e.g., SRAM, DDR DRAM, flash, etc.) utilized as local memory by the controller 112. Various data structures and data sets may be stored by the memory including one or more map structures 122, one or more caches 124 for map data and other control information, and one or more data buffers 126 for the temporary storage of host (user) data during data transfers. A non-processor based hardware assist circuit 128 may enable the offloading of certain memory management tasks by one or more of the controllers as required. The hardware circuit 118 does not utilize a programmable processor, but instead uses various forms of hardwired logic circuitry such as application specific integrated circuits (ASICs), gate logic circuits, field programmable gate arrays (FPGAs), etc.

The memory module 114 includes a memory module electronics circuit 130 (hereinafter "MME") and a flash memory array 132. The MME 130 includes read/write/erase (R/W/E) circuitry and other control circuitry incorporated into the memory module 114 to write data to the flash memory 132. The MME may be formed of one or more programmable processor circuits with associated programming in memory, and/or hardware circuits adapted to carry out various commands and data transfers with the controller 112.

The flash memory 132 includes a number of flash dies 134 (referred to as die 0 to die 3). While only three dies are shown, any number can be used. The MME 130 can operate to carry out parallel data transfer operations along each of the channels (lanes) established with the associated dies 134. The flash memory may be arranged as a single storage tier, or as multiple tiers as required.

While not limiting, it will be recognized by those skilled in the art that current generation SSDs and other data storage device systems can be formed from integrated memory modules such as 114 that are commercially available from a source of such devices. The memory modules may be integrated into an SSD by a device manufacturer which supplies the controller functions and tailors the controller to operate with the memory module. The controller and memory module are thus separate operational entities which communicate across one or more defined data and command interfaces. A "pull" system is commonly used in which the controller 112 issues commands and then repetitively checks (polls) the status of those commands by the memory module 114 to determine whether the commands have been completed.

Figure 3:
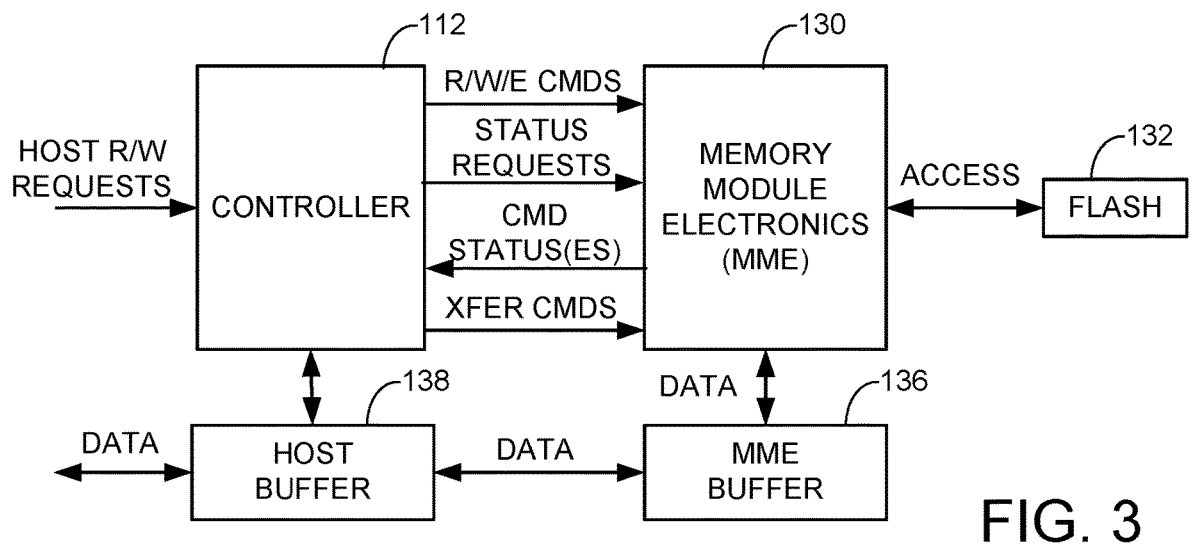
FIG. 3 illustrates data and command flows between the controller and memory module electronics (MME) of FIG. 2 in some embodiments.

FIG. 3 shows aspects of the controller 112 and MME 130 in greater detail. An MME buffer memory 136 is incorporated into or otherwise utilized by the MME 130 to temporarily store data being transferred between the flash memory 132 and a host data buffer 138 of the controller 112. To effect such data transfers, the controller 112 issues various commands to the MME 130 such as read commands, write commands, erase commands, data transfer commands and status commands (also referred to as status requests). The MME 130 provides various command status responses to provide an indication of the status of the controller commands.

When reading data from the flash memory 132, the controller 112 issues a read command with a format that identifies the requested data to be returned from the memory to the controller for subsequent transfer to an external host device coupled to the SSD 110 (e.g., host 102 in FIG. 1). The MME 130 schedules and executes the read command and places the retrieved data into the local MME buffer 136. The controller 112 subsequently issues one or more status requests, such as read status enhanced (RSE) commands, which request a status associated with the retrieved data. The MME 130 supplies a read status in response to each status request.

If the MME 130 has not yet completed the data read operation, the MME may signal a "command still pending"

type read status (also referred to as a "not ready" response). Once the data read operation is completed, the MME signals a "ready to transfer" read status (also referred to as a "ready" response), which indicates the retrieved data are pending in the MME buffer 136 and ready for transfer to the host buffer 138. The controller 112 subsequently issues a transfer (XFER) command to transfer the data from the MME buffer 1136 to the host buffer 138, after which the data are transferred to the requesting host device.

Write (program) operations may be carried out in a similar fashion. The controller 112 issues a write command to the MME 130, and transfers the write data to the host buffer 138 pending transfer to the MME buffer 136 for subsequent processing and writing to the flash memory 108. The MME 130 will signal a command complete type response to the controller 112 to indicate the data have been successfully written to the flash memory.

Erase commands are issued by the controller 112 to erase selected units of memory within the flash memory 132, such as certain erasure blocks which constitute the smallest unit of memory that can be erased at a time. The erasure blocks may be grouped into larger multi-block sets referred to as garbage collection units (GCUs). Responsive to an erase command, the MME 130 will schedule a garbage collection operation in which current (valid) data within the affected blocks are copied to a new location, the blocks are erased and then placed into an allocation pool pending subsequent allocation for the storage of new data. As will be appreciated, erasable memories such as NAND flash typically require an erasure operation before a given location can be overwritten with new data.

Figure 4:
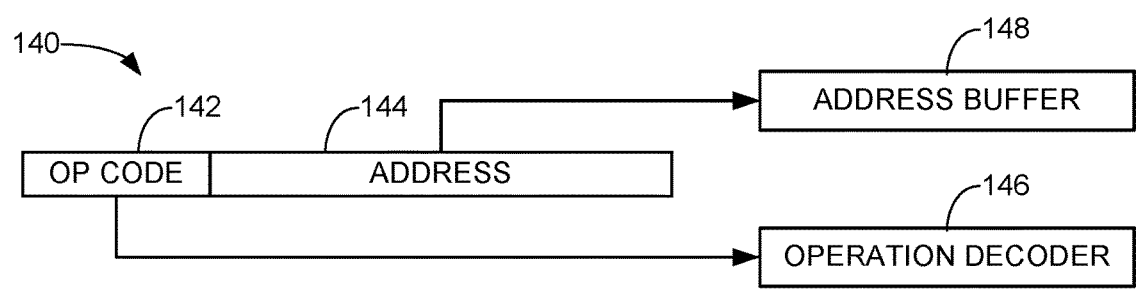
FIG. 4 is an illustrative format for commands issued by the controller to the MME.

These and other various commands issued by the controller 112 to the MME 130 can take a general form as set forth by FIG. 4. An exemplary command 140 includes an op code 142 and an address 144. The op code 142 is a multi-bit sequence that is decoded by an operation decoder 146 of the MME 130 to signify the desired operation, or action, to be taken by the MME. A first multi-bit sequence may signify a read command, a second multi-bit sequence may signify a program command, and so on.

The address 144 represents a corresponding memory location upon which the command is to be executed. The address 144 is loaded to an address buffer 148 of the MME 130. The address can take a variety of forms and may include values identifying a particular die, plane, garbage collection unit (GCU), erasure block, page, row, column offset, etc. Both row and/or column addressing can be used. Other elements may be incorporated into the command format as desired, such as headers, parity bits, etc. but such are omitted for simplicity of illustration.

At this point it will be noted that the particular format of a given command will depend on the communication protocols established to govern I/O communications between the controller and the MME. Commands such as status requests may include an op code portion but not a corresponding address portion, etc.

Figure 5:
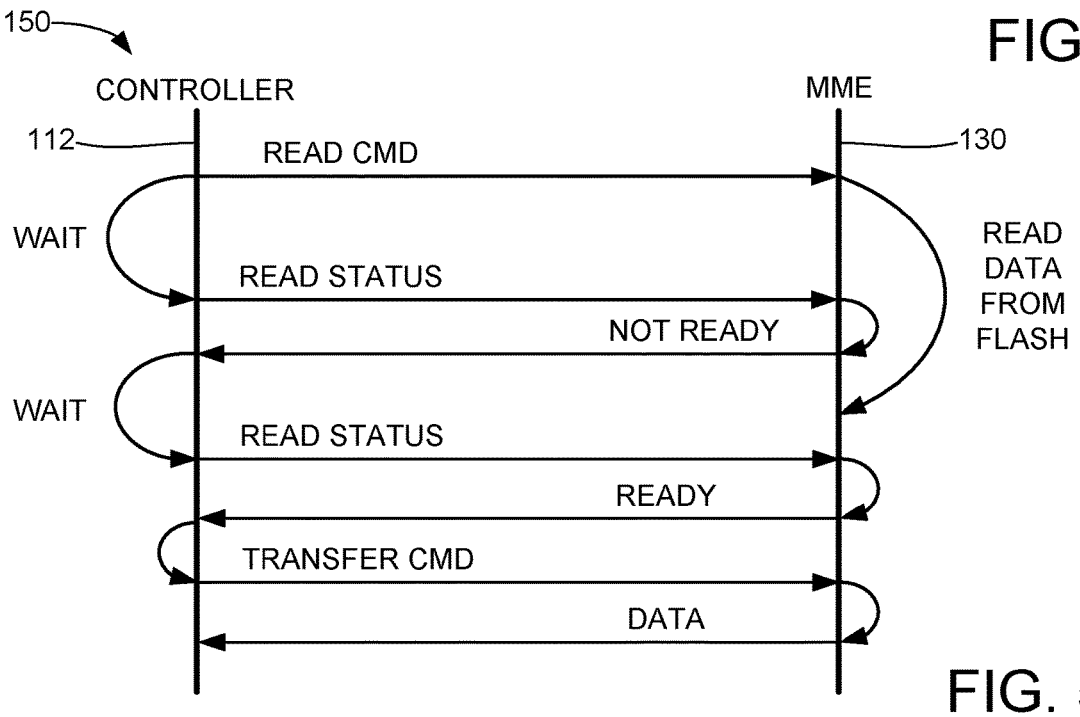
FIG. 5 is a timing diagram showing a pull system used by the controller and MME to transfer commands, status requests and data.

FIG. 5 provides a timing diagram 150 to illustrate a general sequence of operations that are carried out during the processing of a selected command between the controller 112 and the MME 130. In FIG. 5, it is contemplated that the command is a read command to read a selected amount of data from a selected location within the MME. A read command with the format shown in FIG. 4 is issued by the controller 112 to the MME 130. Once received, the MME proceeds to schedule and execute the reading of the requested data from the flash memory 132.

After a given wait period (delay time), the controller issues a first read status request. The MME decodes the command (read status request), determines the state of the system (execution of the command is still in progress), and issues a response (not ready). A subsequent wait time is experienced by the controller, followed by the issuance of a second read status request to the MME. The second wait time may be the same duration as the first wait time, or a shorter wait time may be used for the second interval. In the intervening time between the first and second status requests, the read command is completed and the data are moved to the MME buffer 136 (FIG. 3).

The MME processes the second read status, this time indicating that the data are ready. This is followed by a transfer command from the controller, and the data are transferred from the MME buffer 136 to the host buffer 138 (FIG. 3) pending transfer to the requesting host. It will be appreciated that other commands, such as write commands and erase commands, will follow a similar sequence: a top level command is issued, followed by one or more status requests to track the progress of the command, followed by subsequent processing once the command is indicated as having been completed.

Depending on the configuration and workload of the system, many hundreds or thousands of command sequences similar to that shown in FIG. 5 can be concurrently processed by the respective controller and MME. While only two status requests were issued in FIG. 5, it will be appreciated that any number of additional status requests may be issued during the pendency of a given command. It follows that issuing many unsuccessful status requests for many pending commands can provide a significant load to both the controller and the MME during host data I/O transfers. At the same time, significantly lengthening the delays between status requests to remove these premature requests may undesirably lower the effective host data I/O data transfer rate since the MME may complete commands long before the controller requests a status for the commands.

Figure 6:
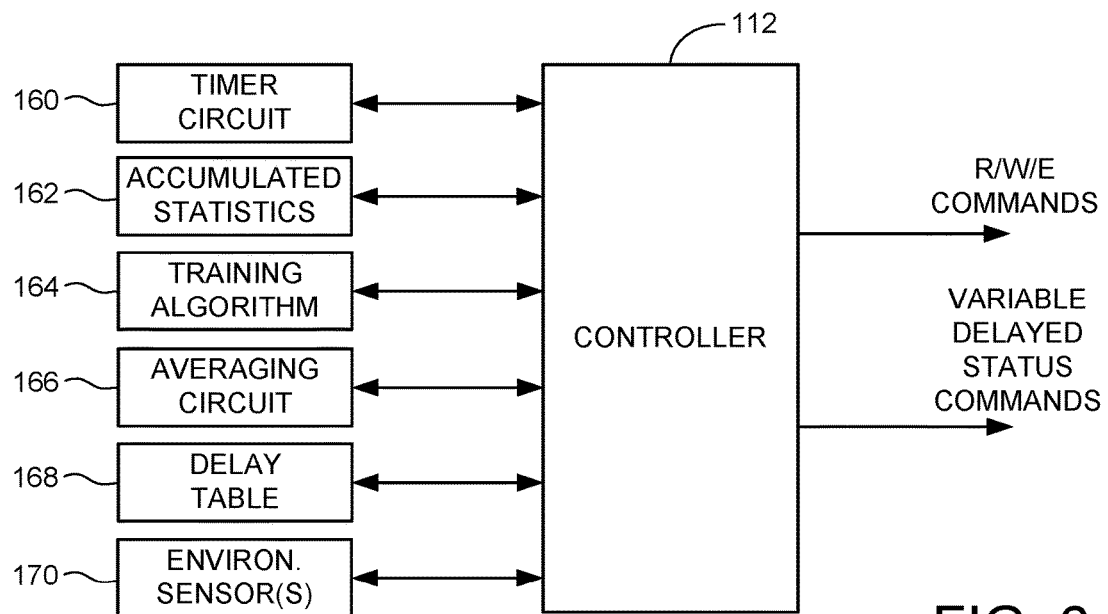
FIG. 6 illustrates a manner in which the controller establishes variable delay time intervals for different locations within the NVM.

The controller 112 is configured to adaptively adjust the various delay times that are encountered for various types of commands to better manage the issuance of status commands and match the actual performance of the MME 130. FIG. 6 shows the controller 112 in conjunction with various operational circuits that are incorporated into or otherwise utilized by the controller. As with the controller, the various circuits can be realized in hardware and/or firmware (programming) as desired.

The circuits include a timer circuit 160, an accumulated statistics table 162 stored as a data structure in local memory, a training algorithm 164, an averaging circuit 166, a delay table 168 also stored as a data structure in local memory, and one or more environmental sensors 170. Other arrangements can be used including the use of a probabilistic (bloom) filter. The controller utilizes these various circuits to establish appropriate delay times, or delay intervals of elapsed time, for different combinations of types of commands, locations (e.g., different dies, pages, etc.) and environmental conditions (e.g., temperature, command queue depth, etc.). The delay times are thereafter continuously adjusted, such as by being incremented or decremented, in relation to the previous accumulated statistics for the various combinations.

Figure 7:
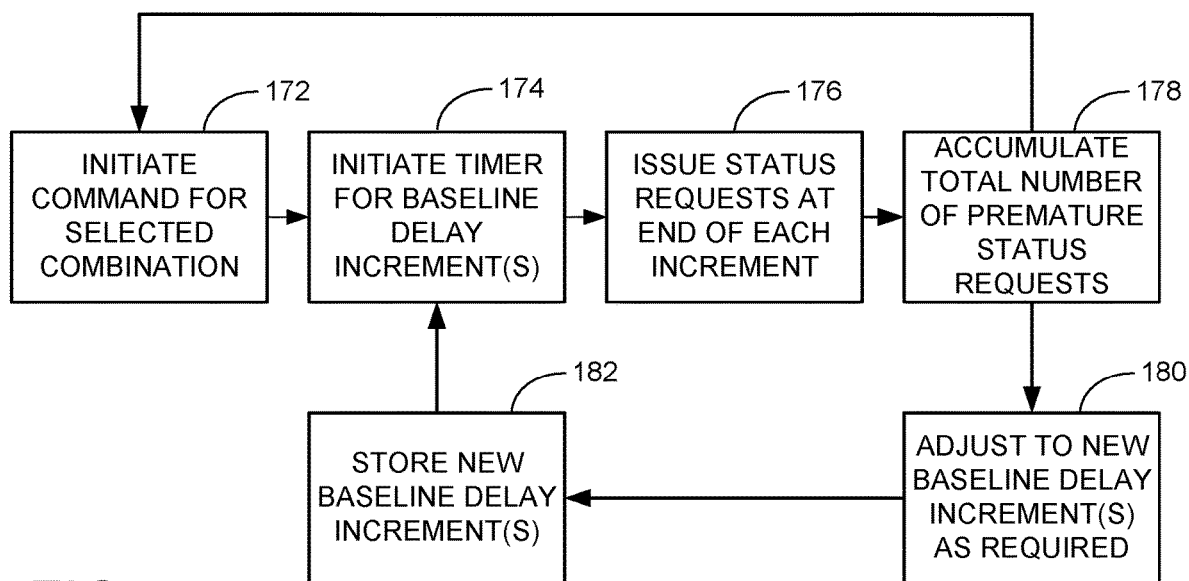
FIG. 7 is a process flow diagram indicating operation of the controller in FIG. 6.

FIG. 7 shows a generalized process flow to describe the operation of the circuitry of FIG. 6 in some embodiments. For purposes of providing a concrete illustration, the flow of FIG. 7 will be contemplated as covering a population of read commands that are issued by the controller 112 to retrieve previously stored data from a particular location, such as a selected die 134 (e.g., die 0). The command population may be for all environmental conditions, or may be a subset of commands that are executed while the device operates within a selected ambient temperature range. This allows the controller to select a different delay time or times for read commands at other temperature ranges (or other environmental conditions), if such are found to be statistically significant.

Each read command is issued as shown by step 172. This is followed by the initiation of a timer to count out an elapsed time interval corresponding to a previously selected baseline increment at 174. As an aside, the same delay interval can be used each time, such as X microseconds, or a longer initial delay time of X ms can be used, followed by shorter delays of Y ms for each successive read request (where X>Y). In one example, X might be on the order of about 40-45 ms, and if used, Y might be on the order of about 5-10 ms. Other values can be used.

As shown at step 176, a status request is issued at the end of each delay period increment, and the MME 130 responds with either a "not ready" or a "ready" response (see FIG. 5). At step 178, the total number of premature status requests, that is, requests that returned the "not ready" indication, are accumulated at step 178.

Once sufficient numbers of statistics have been accumulated, a new baseline delay value, such as X−A or X+B, is assigned at step 180. In some cases, an average of the times required to obtain the response can be interpolated from the accumulated data. The new baseline delay values are stored at step 182 and used for further read requests. In this way, the system can continue to adaptively adjust the baseline delays to both reduce unnecessary (premature) status requests and undesired delays in providing the status after the commands have been completed. In some cases, an accumulated count mask bit can be used to enable the controller to leave out certain counts known to be errant. This may enable more accurate running averages or other accumulated statistics to be determined.

Figure 8:
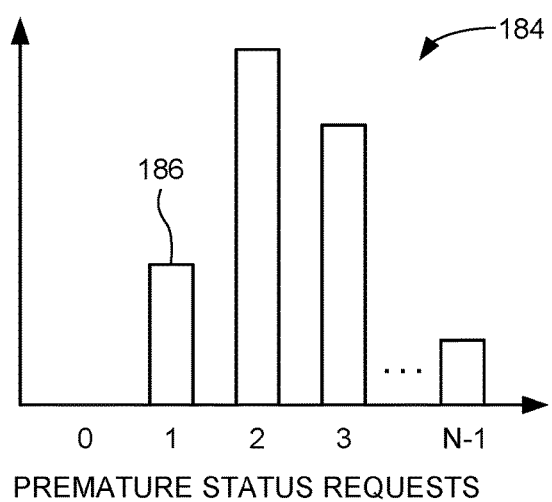
FIG. 8 is a bucket diagram illustrating accumulated numbers of premature status requests for a population of commands.

FIG. 8 is a bucket analysis graph 184 showing various bars 186 (buckets) for different numbers of accumulated premature status requests from the operation of FIG. 7. The data accumulated in FIG. 8 show different relative respective numbers of premature status requests, from 0 to N−1. The amount of variability associated with the tested combination, as well as the increments being used between successive status requests, will tend to affect the shape of the overall distribution.

Figure 9:
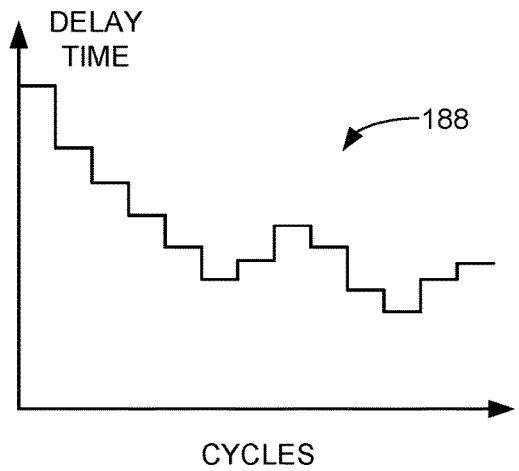
FIG. 9 is a graphical representation of adaptive adjustments to a selected delay time interval for a selected location within the NVM.

Nevertheless, it is contemplated that, over time, the distributions obtained will be somewhat Gaussian in nature, with a peak or otherwise average value in the vicinity of the average command completion time. Data such as represented in FIG. 8 can be accumulated over a statistically significant number of commands to arrive at one or more new suitable baseline delay values. In some cases, the average may be set so that a small number of acceptable premature status requests are issued, such as 1-2 requests, or some other value. FIG. 9 shows a curve 188 indicating the adaptive adjustments that may be applied to the delay time for a given combination over time. It is contemplated that the delay time will converge to a steady state value or range. Over time, environmental factors such as temperature, aging, read disturb effects, read recovery effects due to uncorrectable errors, etc., may be factored into the adaptive adjustment of the appropriate delay time. The amount of adjustment can be limited to a maximum increment or decrement value to add hysteresis to the system and ensure closed loop convergence to an optimal delay value. Averaging, rolling windows, curve fits, regression analyses and other techniques can be readily applied to arrive at the next adjusted delay value(s). A suitable amount of previously history data for the associated location can be maintained in memory (see e.g., accumulated statistics block 162 in FIG. 6) and used for new calculations.

Figure 10:
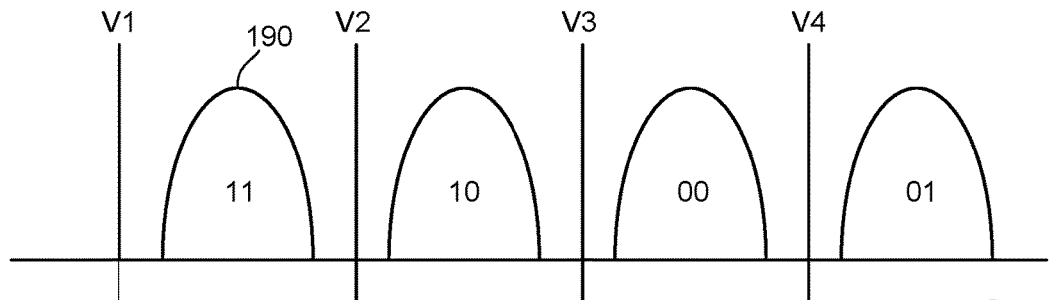
FIG. 10 shows different populations of solid-state memory cells of the NVM.

In some cases, different locations within the same die or other memory structure may provide significantly different response times. FIG. 10 shows a series of population curves 190 for different flash memory cells programmed as multi-level cells (MLCs). Each MLC stores a total of two bits. A row of memory cells (e.g., coupled to a common word line within an erasure block) may be configured as MLCs to concurrently store a lower page of data and an upper page of data. The lower page is represented by the most significant bits (MSBs) of the programmed states, and the upper page is represented by the least significant bits (LSBs). Other recording schemes can be used including SLCs (single-level cells), TLC (three-level cells), QLC (four level cells), etc.

The programmed states of the respective populations can be determined through the application of one or more voltage thresholds to the control gates of the cells. Four such voltage thresholds are shown at V1-V4. Generally, application of a voltage threshold will tend to place cells below the threshold (e.g., to the left in FIG. 10) in a conductive state and will tend to maintain cells above the threshold (e.g., to the right in FIG. 10) in a normally non-conductive state.

It follows that the lower page of data can be read faster than the upper page of data, on the basis that only a single voltage threshold (e.g., V3) need be applied in order to discern the MSB of the respective states, and hence, recover the lower page of data. Additional thresholds (e.g., V2, V4) need to be applied to discern the LSB of the respective states and recover the upper page of data. Thus, the controller 112 may further adjust the baseline delay with regard to which page of data is being retrieved. If a lower page is being requested, a first delay value may be used, while if an upper (or higher) page is being requested, a longer, second delay value may be used. In some cases, a baseline delay value may be determined based on the retrieval of the lower page (SLC data) and a small increment may be added to the baseline delay value to account for the additional time needed to retrieve upper or higher page data from the same set of cells.

Different types of commands tend to require significantly different amounts of average time to complete. For example, read commands may require X ms, write commands may require Y ms, and erase commands may require Z ms (where X<Y<Z). Nevertheless, all of the pages from a selected erasure block or group of erasure blocks may tend to provide respectively similar read time performance, write time performance and erase time performance. In such case, average values may be calculated for each type of command on a per erasure block basis, with adjustments for page location as required. Different dies 134, however, may exhibit significantly different delay times in order to complete the various commanded operations, so that one die provides average read/write/erase times of (X, Y, Z), while another die provides different average read/write/erase times of (A, B, C).

Figure 11:
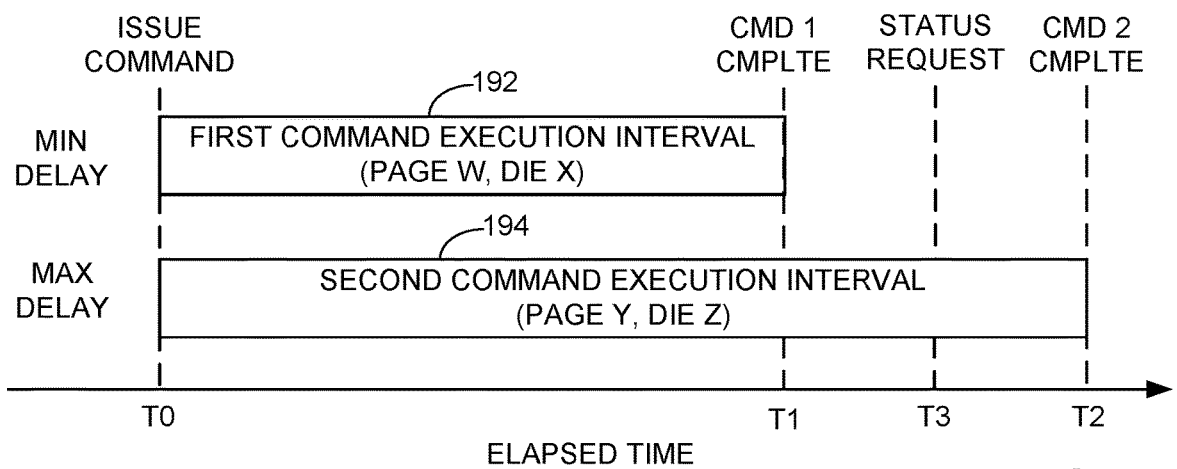
FIG. 11 shows different command execution intervals for the same command executed by different locations within the NVM.

FIG. 11 shows a graphical representation of two separate command execution intervals for two different locations within the flash array. A first command execution interval is represented at 192 and represents the average elapsed time, from time T0 to time T1, to complete execution of a selected command directed to a first selected page W on a first selected die X. A second, longer command execution interval is represented at 194 and represents the average elapsed time to complete execution of the same type of command for a second selected page Y in a second selected die Z, which extends from time T0 to time T2.

An exemplary variable delay time interval is denoted as the elapsed time from T0 to time T3. As noted above, the variable delay time interval represents the time interval from the communication of a first command (selected action at time T0) to the subsequent communication of a second command (status request at time T3). It can be seen that issuing a status request at time T3 may be a sub-optimal solution for both execution intervals; the delay may be considered to long for die X (block 172) and too short for die Z (block 174). Individually tailoring separate delays would therefore provide enhanced throughput performance for the drive, since shorter delay intervals could be used for the faster die X and longer delay intervals could be used for the slower die Z, and the numbers of both premature and unnecessarily delayed status requests would be reduced.

As noted above, in some cases an initial baseline delay will be calculated for a given location for a given type of command, and then other factors such as page location, environmental factors, data aging, program/erase counts, read disturb counts, etc. can be used to increment or decrement the initial baseline delay to provide a final delay value. It will be recalled that, overall, it may be optimum to select a baseline delay that, on average, provides a relatively small number of premature status requests. Continued accumulation of these statistics, as discussed above in FIGS. 7-8, can provide feedback to the controller to increase or decrease the existing setting. A given setting may continue to be used until a threshold limit is reached (either for individual commands or for average numbers of commands) of the number of premature status requests are obtained.

Figure 12:
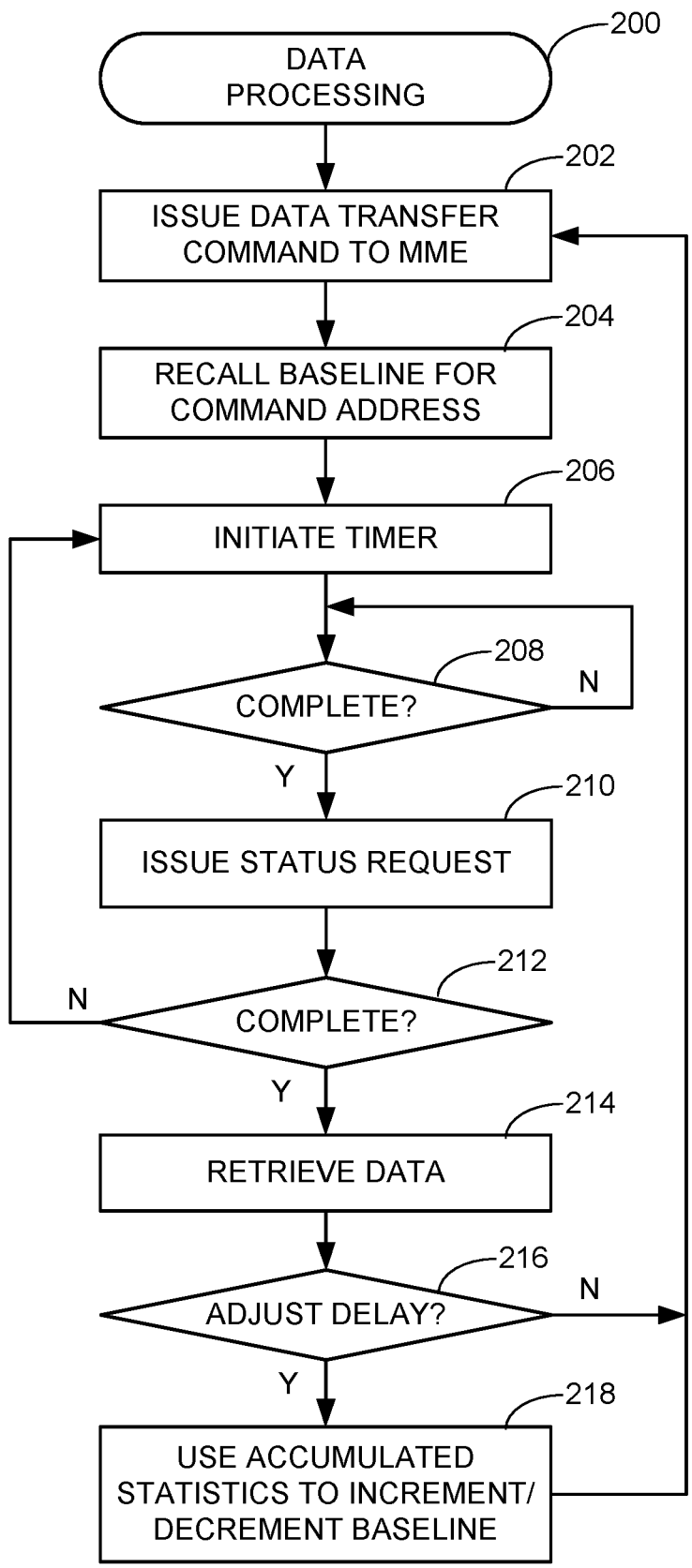
FIG. 12 is a flow chart for a data processing routine indicative of steps carried out in accordance with some embodiments.

FIG. 12 shows a flow chart for a data processing routine 200 to summarize aspects of the foregoing discussion. It is contemplated that the routine represents operation by the controller 112 during the servicing of various data transfer commands issued by the host device 102. The various steps may correspond to a program instruction flow incorporated in programming executed by one or more programmable processors. The routine is merely exemplary and can be modified as required in accordance with the present disclosure.

A data transfer command is initially issued by the controller 112 to the MME 130 at step 202. This may take any number of suitable forms, including a read command, a write command or an erase command. At step 204, the baseline value for the delay time associated with an address of the command (e.g., an address portion of the command as in FIG. 4) is recalled from memory (such as delay table 168, FIG. 6). The baseline value is used to initiate a timer (such as timer circuit 160, FIG. 6) to denote an elapsed time interval corresponding to the baseline value, step 206.

Decision step 208 provides a loop to determine if the elapsed time interval has completed; when it has, the controller 112 proceeds to issue a first status request command to the MME 130 at step 210. Step 212 indicates whether the command execution has been completed; that is, whether the MME returns a "not ready" or "ready" status. If not, the routine passes back to block 206 for the execution of a second time interval. As discussed above, this second time interval may be the same duration as the first time interval, or may be a different time interval. It is contemplated that the time intervals will all be the same or the subsequent time intervals will be shorter, but this is not necessarily required; a different configuration is contemplated where it may be advantageous to provide longer time intervals under certain circumstances.

Once the MME indicates the command has been successfully completed, the flow passes from step 212 to step 214 where the data are retrieved as discussed above in FIG. 5. At this point the controller 112 proceeds to perform other steps as required to complete the servicing of the routine. Additionally, the controller 112 determines whether to adjust the existing baseline delay value at step 216. If so, the accumulated statistics for the associated location are analyzed as discussed above at step 218 to arrive at a new baseline value, which is then stored and used during subsequent operations of step 202.

In some cases, the controller 112 may provide real time adjustments of the various delay times during continued operation, so that the system adaptively adjusts continuously over time. An advantage of this approach is that the system closely monitors and matches ongoing performance of the memory module 114. In other cases, data may be accumulated as provided in FIGS. 7 and 9 and the controller 112 may perform calibration routines during off-line or lower demand intervals to establish appropriate delay intervals. In still other embodiments, the controller 112 may perform test calibration reads on a regular basis (e.g., read at least one page from every die/erasure block combination in the system to assess current delay values and make adjustments as required.

While various embodiments have been described in the environment of a flash memory, such is merely illustrative. The various embodiments can be readily implemented into other forms of solid-state memory including but not limited to spin-torque transfer random access memory (STRAM), resistive random access memory (RRAM), phase change random access memory (PCRAM), magnetic random access memory (MRAM), etc. It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:

a memory module comprising a non-volatile memory (NVM) and a memory module electronics (MME) circuit configured to program data to and read data from solid-state non-volatile memory cells of the NVM;

a statistics table configured to store accumulated statistics of a history of data transfer command wait periods associated with a subset of the memory cells of the NVM; and a controller circuit configured to issue data transfer commands at a first delay rate to the MME circuit, each command including an address within a range of addresses of the subset of the memory cells and a data transfer action to be taken by the MME circuit in relation to the included address, the controller circuit further configured to analyze the stored statistics of the statistics table and adjust the first delay rate to a second delay rate based on the analyzing, the controller circuit further configured to issue further data transfer commands at the second delay rate to the MME circuit in relation to the subset of the memory cells.

2. The apparatus of claim 1, wherein the controller circuit is further configured to accumulate statistics to store in the statistics table by issuing status requests to the MME circuit and receiving a response.

3. The apparatus of claim 2, wherein accumulating statistics comprises accumulating "not ready" responses to status requests.

4. The apparatus of claim 1, wherein the data transfer command wait periods represent a time interval from issuance of a command to a subsequent communication of a "ready" response.

5. The apparatus of claim 1, further comprising an environmental sensor configured to sense an ambient temperature range of the NVM and wherein the statistics table is configured to store the accumulated history statistics in association with the sensed ambient temperature range, the controller circuit further configured to analyze for a current sensed ambient temperature range.

6. The apparatus of claim 1, wherein the controller circuit is configured to analyze by interpolating an average of data transfer command wait periods.

7. The apparatus of claim 1, wherein the controller circuit is further configured to adjust the first delay rate by factoring environmental factors into the adjustment.

8. The apparatus of claim 7, wherein the environmental factors comprise aging and read disturb effects.

9. The apparatus of claim 1, wherein the NVM comprises a NAND flash memory array comprising a plurality of dies, and wherein the selected address comprises a selected die from the plurality of dies.

10. The apparatus of claim 9, further comprising a delay table stored as a data structure in a local memory, the delay table providing the controller circuit with a different variable delay time interval for each of the plurality of dies.

11. A method comprising:
issuing data transfer commands at a first delay rate to a memory module electronics (MME) circuit, each command including an address within a range of addresses of a subset of the memory cells of a solid-state nonvolatile memory (NVM) and a data transfer action to be taken by the MME circuit in relation to the included address;
accumulating statistics of a history of data transfer command wait periods associated with the subset;
storing the accumulated history statistics as a statistics table in a data structure in local memory;
analyzing the stored statistics;
adjusting the first delay rate to a second delay rate based on the analyzing; and
issuing further data transfer commands at the second delay rate to the MME circuit in relation to the subset of the memory cells.

12. The method of claim 11, wherein accumulating statistics comprises issuing status requests to the MME circuit and receiving a response.

13. The method of claim 12, wherein accumulating statistics comprises accumulating "not ready" responses to status requests.

14. The method of claim 11, wherein the data transfer command wait periods represent a time interval from issuance of a command to a subsequent communication of a "ready" response.

15. The method of claim 11, wherein accumulating history statistics comprises accumulating command completion time performance of the NVM.

16. The method of claim 11, wherein analyzing comprises interpolating an average of data transfer command wait periods.

17. The method of claim 11, wherein analyzing comprises using an accumulated count mask bit to leave out known errant counts of data transfer command wait periods.

18. The method of claim 11, wherein adjusting the first delay rate further comprises factoring environmental factors into the adjustment.

19. The method of claim 18, wherein the environmental factors comprise aging and read disturb effects.

20. The method of claim 11, wherein adjusting the first delay rate comprises determining a baseline delay value based on retrieval of lower page single level cell data from a set of cells and adding an additional delay to the baseline delay value to account for additional time to retrieve higher page data from the same set of cells.

* * * * *